June 9, 1964  T. J. BISCHOFF ETAL  3,136,565
SUSPENSION MECHANISM
Filed Feb. 21, 1963
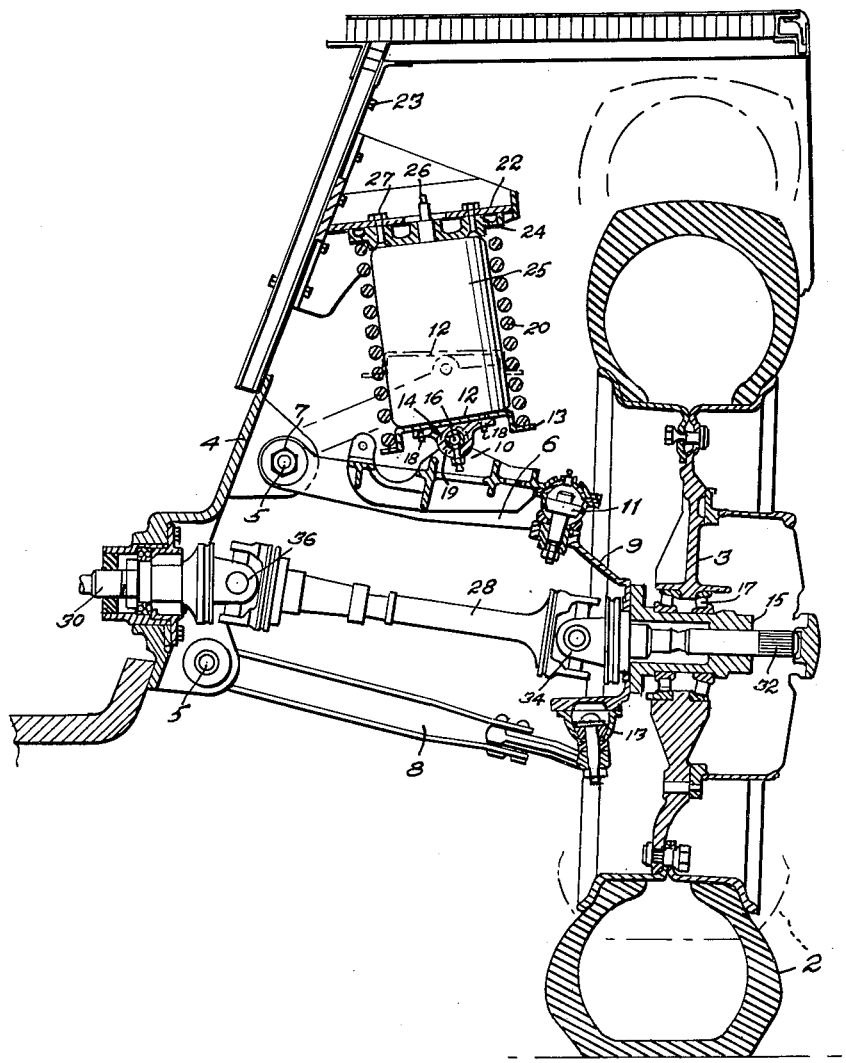
INVENTORS:
Thomas J. Bischoff
Rayburn A. Hartwig
BY
S. J. Rotondi, A. J. Dupont & C. R. White

United States Patent Office 3,136,565
Patented June 9, 1964

3,136,565
SUSPENSION MECHANISM
Thomas J. Bischoff, 13330 Elgin, Huntington Woods, Mich., and Rayburn A. Hartwig, 8506 Strong Ave., Orangevale, Calif.
Filed Feb. 21, 1963, Ser. No. 260,968
1 Claim. (Cl. 280—96.2)
(Granted under Title 35, U.S. Code (1952), sec. 266)

This invention may be manufactured and used by the Government for governmental purposes without the payment to us of any royalty thereon.

This invention relates in general to spring suspension systems for vehicles and particularly to improved pivoted seats for the coil springs which form part of the system.

Prior art suspension systems have been made with pivoted seats for the axially loaded coil suspension springs. However, the prior art coil springs are subject to over center load moments and instability when the suspension arms which support the spring seats are rotated and the springs are greatly compressed. Some of the prior art devices have guide members mounted within the spring which aid in preventing the spring from buckling when compressed. These arrangements have inherent disadvantages since they do not permit full utilization of the spring in absorbing road shocks and because of the complexity and expense of placing guide members within the spring.

It is therefore an object of the present invention to provide an improved pivoted seat for the coil springs of a vehicle suspension system which are not subject to over center load moments and which prevent spring buckling.

It is also an object of the present invention to provide an improved suspension structure which eliminates the necessity of providing guide devices to prevent spring buckling.

A further object of the invention is to provide a coil spring seat support pivoted on a suspension arm which will be stable in all positions of the supporting suspension arm.

Additional objects and advantages will become apparent as the following detailed description proceeds, taken in conjunction with the accompanying drawing in which:

The single figure is a front elevational view, partly in section, of a rear suspension installation on a vehicle.

Referring to the drawing, there is shown a ground wheel 2 which is mounted for vertical movement on vehicle body 4 by superposed suspension arms 6 and 8. These suspension arms are pivotally connected to the body by bolts 5 and nuts 7 and to the hub bracket 9 by suitable ball joints 11 and 13. The bracket 9 is further mounted upon sleeve 15. Wheel hub 3 which supports wheel 2 is rotatably mounted on sleeve 15 by suitable bearings 17.

The upper suspension arm is formed with an upwardly extending bifurcated projection 10 to provide a mount for spring seat 12. This spring seat has a circular flat base portion, integral vertical side walls and an outwardly extending flange 13 substantially perpendicular to these walls. Secured to the bottom of the base portion of the spring seat by suitable fasteners 18 is pivot block 14. This pivot block is formed with a projection 19 which extends between the two branches of projection 10. An elongated pivot pin 16 extends through suitable openings formed in projections 10 and 19 to pivotally mount the spring seat to arm 6. Anti-friction bearings may be disposed between the pivot pin 16 and the interior surfaces of projections 10 and 19 which define the openings for pivot pin 16. As shown in FIG. 1, a cylindrical helical spring is mounted between the movable suspension arm 6 and the vehicle body to absorb road shocks. This spring is positioned on the seat 12 with the end coil contacting flange 13. As shown in FIG. 1, the bottom coil which contacts the flange 13 is coplanar with pivot pin 16. Spring seat 12 may optionally be mounted on lower arm 8.

A bracket 22 anchored by suitable fasteners such as bolts 23 to the vehicle frame is provided to secure the spring 20 to the vehicle body. This bracket is spaced from the suspension arms and the attached spring seat. Secured to the bracket 22 by bolts 27 is spring holder or seat 24 which conforms to the internal diameter of coil spring 20. The coil spring fits closely around the holder and the end coil rests against the flat under surface of bracket 22.

An air bag 25 is mounted in the interior of the coil spring 20 to increase the spring rate and provide spring damping. Planar disk portions positioned within the spring are provided on the spring seats, and the elastic end walls of the air bag are in abutment with the disks. It will be understood that the use of air bag 25 is but one example of means to increase the spring rate and to dampen spring vibrations and is not given by way of limitation. Conventional shock absorbers or other arrangements may be substituted for air bag 25 for the same purpose. Air bag 25 has access stem 26, providing a passage to the interior of bag, which extends through openings formed in the bracket and the spring holder. The coils of the spring which contact bracket 22 and flange 13 are flattened to insure proper spring seating.

The axle 28, drive means 30, spindle 32 and the universal connections 34 and 36 are conventional and do not form part of the invention, and it is to be understood that this invention is not limited to their use specifically but components of other design may be considered equally useful.

As shown in the drawing, the axial load on the coil spring is not always transmitted through the central axis of coil spring 20. When the wheel 2 encounters a projection or depression, the wheel, the suspension arms and spring seat will, due to their connection to body 4, be displaced. For example, these elements might be moved to the phantom line position shown in FIG. 1. The spring 20 will be further compressed to dissipate the energy imparted to wheel 2. The axial load on the spring will be off-set slightly throughout the arc of pivot 12 during this movement. This causes the spring to bend with one side of the coil spring being compressed more than the opposite side. In such a position the spring will have the natural tendency to return to its normal axial position. This results in a kick load perpendicular to the central axis on the spring. In prior art devices in which the pivot for the spring seat is below the seat and the last coil of spring, an off-center kick load will result. Such off-center loads will cause undesirable spring buckling and tend further the off-center loads, resulting in the necessity of providing guides to maintain spring stability. However, in the present invention, the kick load will be through pivot 16 with no off-center load or spring buckling. Furthermore, by having the pivot so arranged the use of guide members is eliminated and a greater degree of freedom of movement is possible than that allowed by the prior art.

It is contemplated that any type of pivot such as a ball and socket or pin and journal may be used in securing the spring seat to the upper suspension arm. Furthermore, the spring 20 may be horizontally mounted between one of the suspension arms and the vehicle body instead of the vertical mounting shown in the drawing.

Although only a single spring and pivoted seat arrangement has been shown, it is obvious that such arrangements may be used with each wheel on the vehicle.

Having described the invention, what is claimed is:

In a vehicle suspension, a superstructure, a pair of vertically spaced transversely extending control arms pivotally mounted at their inboard ends for swinging movement about vertically spaced longitudinally extending pivot axes fixed with respect to said superstructure, a vertically extending hub bracket pivotally attached by universal ball joints at its upper and lower end to the respective outboard ends of said control arms, an upper spring seat disposed on said superstructure above the upper of said arms, an upwardly extending pivotal mount formed adjacent the central portion of said last mentioned arm, a lower spring seat having a spring supporting flange, said lower spring seat being pin connected to said pivotal mount for movement about a generally longitudinally extending axis, said pivotal mount pin axis spaced above the plane formed by said pivotal end connections of the upper of said arms, a helical spring disposed in compression between said spring seats, said upper and lower spring seats including opposed planar disk surfaces positioned within said spring, said disks having a diameter which is substantially equal to the inside diameter of said spring, an inflatable cylindrical air bag shock absorber having elastic side and end walls disposed concentrically within said spring with said end walls in abutment with said disk surfaces, said pivotal mount pin axis arranged to be encircled by and substantially coplanar with the bottom coil of said spring.

References Cited in the file of this patent

UNITED STATES PATENTS

| | | |
|---|---|---|
| 2,039,670 | Wagner | May 5, 1936 |
| 2,375,670 | MacPherson | May 8, 1945 |
| 2,403,145 | Ulrich | July 2, 1946 |
| 2,494,144 | Restall | Jan. 10, 1950 |
| 2,710,184 | Pemberton | June 7, 1955 |
| 2,819,893 | Edwards | Jan. 14, 1958 |
| 3,075,787 | Mineck | Jan. 29, 1963 |
| 3,086,792 | Schultz | Apr. 23, 1963 |

FOREIGN PATENTS

| | | |
|---|---|---|
| 1,043,096 | France | June 10, 1943 |
| 226,362 | Australia | Aug. 21, 1958 |